US011467539B2

(12) United States Patent
Rochat et al.

(10) Patent No.: US 11,467,539 B2
(45) Date of Patent: Oct. 11, 2022

(54) TIMEPIECE DISPLAY MOBILE COMPONENT WITH FRICTION ADJUSTMENT MECHANISM

(71) Applicant: Montres Breguet SA, L'Abbaye (CH)

(72) Inventors: Fabrice Rochat, Vallorbe (CH); Alain Zaugg, Le Sentier (CH)

(73) Assignee: Montres Breouet SA, L'Abbaye (CH)

( * ) Notice: Subject to any disclaimer, the term of this patent is extended or adjusted under 35 U.S.C. 154(b) by 478 days.

(21) Appl. No.: 16/664,040

(22) Filed: Oct. 25, 2019

(65) Prior Publication Data

US 2020/0192295 A1 Jun. 18, 2020

(30) Foreign Application Priority Data

Dec. 13, 2018 (EP) .................................... 18212241

(51) Int. Cl.
*G04B 13/02* (2006.01)
*G04B 29/04* (2006.01)

(52) U.S. Cl.
CPC ........... *G04B 29/04* (2013.01); *G04B 13/021* (2013.01)

(58) Field of Classification Search
CPC .... G04B 13/025; G04B 13/021; G04B 13/02; G04B 13/023; G04B 29/04
See application file for complete search history.

(56) References Cited

U.S. PATENT DOCUMENTS

| 7,926,355 | B2 * | 4/2011 | Bannier | ................... G04D 7/04 |
| | | | | 73/777 |
| 9,529,328 | B2 * | 12/2016 | Courvoisier | ......... G04B 13/021 |
| 10,054,905 | B2 * | 8/2018 | Paratte | ................. G04B 17/063 |
| 10,222,748 | B2 * | 3/2019 | Paratte | ................... G04B 17/00 |
| 10,365,608 | B2 * | 7/2019 | Mertenat | ............. G04B 13/021 |

(Continued)

FOREIGN PATENT DOCUMENTS

| CN | 2615708 Y | 5/2004 |
| CN | 203643751 U | 6/2014 |

(Continued)

OTHER PUBLICATIONS

Communication dated Jan. 7, 2021, from the China National Intellectual Property Administration in application No. 201911272608.9.

(Continued)

*Primary Examiner* — Sean Kayes
(74) *Attorney, Agent, or Firm* — Sughrue Mion, PLLC

(57) ABSTRACT

Timepiece display mobile component (1) comprising at least one resilient strip (4) returned to a display axis (DA), to cooperate in a friction drive with an arbor (2) of a drive mobile component (3) of a movement (100) or a mechanism, about the axis (DA), this mobile component (1) includes a flange (5) comprising, facing each resilient strip (4), an aperture (6) for the insertion and guidance of a manual or robotic tool to allow the tool to move the resilient strip (4) away from its rest position, and to insert the mobile component (1) on an arbor (2) when the resilient strip (4) is sufficiently far away to allow this mobile component to pass, and to ensure a constant friction value of all the resilient strips (4) on the arbor (2) when they are in frictional cooperation with the arbor (2) and when the tool is no longer in contact with the resilient strips (4).

16 Claims, 4 Drawing Sheets

(56) References Cited

U.S. PATENT DOCUMENTS

| | | | | |
|---|---|---|---|---|
| 11,003,140 B2* | 5/2021 | Vuille | ...................... | B23P 19/04 |
| 2015/0355602 A1* | 12/2015 | Wu | ...................... | G04B 13/021 |
| | | | | 368/190 |
| 2016/0026154 A1* | 1/2016 | Courvoisier | ......... | G04B 13/022 |
| | | | | 368/184 |
| 2017/0185040 A1* | 6/2017 | Mertenat | .............. | G04B 13/021 |

FOREIGN PATENT DOCUMENTS

| | | |
|---|---|---|
| CN | 106537262 A | 3/2017 |
| EP | 2 977 829 B1 | 7/2017 |
| EP | 2 957 963 B1 | 10/2017 |
| EP | 2 765 462 B1 | 4/2018 |
| JP | 2003194964 A | 7/2003 |
| JP | 2018-155587 A | 10/2018 |

OTHER PUBLICATIONS

European Search Report received in corresponding European Application No. 18 21 2241, dated May 24, 2019.

\* cited by examiner

TIMEPIECE DISPLAY MOBILE COMPONENT WITH FRICTION ADJUSTMENT MECHANISM

CROSS-REFERENCE TO RELATED APPLICATION

This is application claims benefit of priority European Patent Application No. 18212241.6 filed Dec. 13, 2018, the contents of all of which are incorporated herein by reference.

FIELD OF THE INVENTION

The invention concerns a timepiece display mobile component comprising at least one resilient strip intended to be returned to a rest position close to a display axis, to cooperate in a friction drive with an arbor comprised in a drive mobile component of a movement or a timepiece mechanism, about said display axis.

The invention also concerns a display adjustment assembly including at least one such display mobile component.

The invention also concerns a timepiece mechanism, comprising at least one drive mobile component including an arbor arranged to cooperate with such a display mobile component and/or such a display adjustment assembly.

The invention also concerns a timepiece movement including at least one such mechanism and/or at least one such display mobile component, and/or one such display adjustment assembly.

The invention also concerns a timepiece, in particular a watch, including at least one such movement and/or at least one such mechanism and/or one such display mobile component, and/or at least one such display adjustment assembly.

The invention concerns the field of timepiece display mechanisms.

BACKGROUND OF THE INVENTION

Normal friction systems in horology, such as indenting and friction wheels, have several well-known drawbacks:
the friction torque is difficult to control;
the friction torque has poor stability over time;
assembly and disassembly are difficult.

Japanese Patent document No. JP2018155587A in the name of SEIKO INSTR. INC. discloses a mobile component whose position is slidably adjustable, comprising an annular body carrying substantially radial arms arranged to resiliently clamp a same arbor, in different axial positions of said arbor.

European Patent document No. EP2957963A1 in the name of ETA Manufacture Horlogère Suisse discloses a timepiece mobile component in several parts, which comprises an arbor that includes, about a first pivot axis, a housing arranged for receiving a second component consisting of a plate in a single axial position, this plate having a peripheral surface with reference to a second pivot axis. The arbor comprises, on either side of this housing, in the direction of said first pivot axis, an axial abutment surface arranged to hold the plate in abutment on the arbor. This plate comprises a first arm, which is radially resilient with respect to the second pivot axis, and at least a second arm, which is stiff or radially resilient with respect to the second pivot axis, this first resilient arm and second arm together forming a clamp arranged to clamp a radial bearing surface comprised in the arbor in proximity to the axial abutment surface. This arbor includes an entry ramp, which is arranged to push back radially each first resilient arm and, if comprised in the plate, each second resilient arm, to allow the plate to be placed on the arbor.

European Patent document No. EP2765462A1 in the name of ETA Manufacture Horlogère Suisse discloses a shock-resistant timepiece wheel for driving a component having non-zero unbalance relative to a pivot axis of the wheel, which wheel includes, on one hand, an arbor for pivotally guiding the wheel about the pivot axis, and on the other, drive means arranged or placed on a flange of the wheel. The wheel includes at least one flexible element between the arbor and the flange. The flange has a cylindrical shoulder cooperating in abutment for centring purposes with a complementary cylindrical shoulder comprised in the arbor to ensure perfect concentricity of the drive means with the arbor.

European Patent document No. EP2977829A1 in the name of ETA Manufacture Horlogère Suisse discloses a timepiece assembly with a braking mobile component, comprising an arbor having a first surface cooperating for pivoting guidance purposes with a second surface of a wheel pivotally mounted on the arbor, wherein the first surface or respectively the second surface includes at least one braking surface on at least a first arm subjected to the action of at least a first elastic return means, in one piece with the arbor or respectively the wheel, and arranged to exert a radial force with respect to the pivot axis on the second surface or respectively the first surface. This braking mobile component assembly includes built-in means for discrete value adjustment of the friction exerted by the braking surface on the second surface respectively the first surface.

SUMMARY OF THE INVENTION

The invention proposes to define an adjustment mechanism, with a friction system, for adjusting any display mobile component, and in particular for setting the time, in timepiece movements.

To this end, the invention concerns a timepiece display mobile component with a friction adjustment mechanism according to claim 1.

The invention also concerns a display adjustment assembly including at least one such display mobile component.

The invention also concerns a timepiece mechanism, comprising at least one drive mobile component including an arbor arranged to cooperate with such a display mobile component and/or such a display adjustment assembly.

The invention also concerns a timepiece movement including at least one such mechanism and/or at least one such display mobile component, and/or one such display adjustment assembly.

The invention also concerns a timepiece, in particular a watch, including at least one such movement and/or at least one such mechanism and/or one such display mobile component, and/or at least one such display adjustment assembly.

BRIEF DESCRIPTION OF THE DRAWINGS

Other features and advantages of the invention will appear upon reading the following detailed description, with reference to the annexed drawings, in which.

DETAILED DESCRIPTION OF PREFERRED EMBODIMENTS

Figure 1:
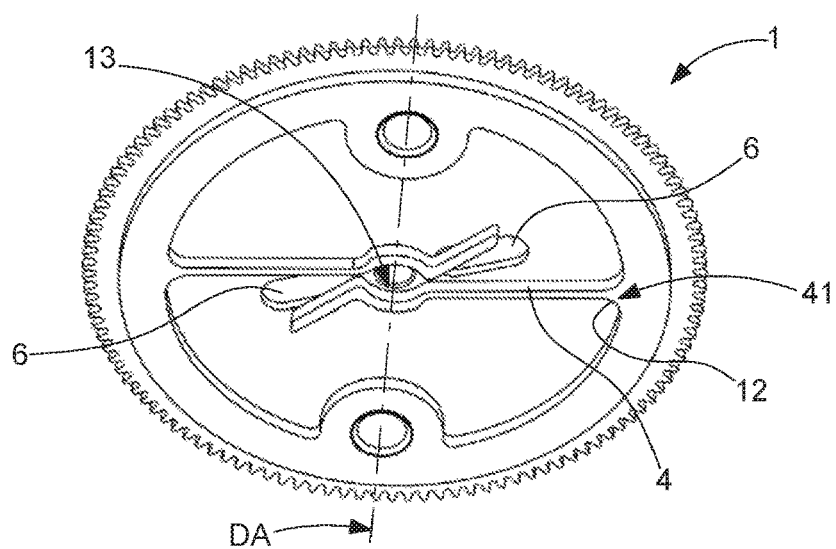
FIG. 1 represents a schematic, perspective view of a display mobile component according to the invention, comprising a flange and a one-piece resilient spring structure, assembled to one another.
Figure 2:
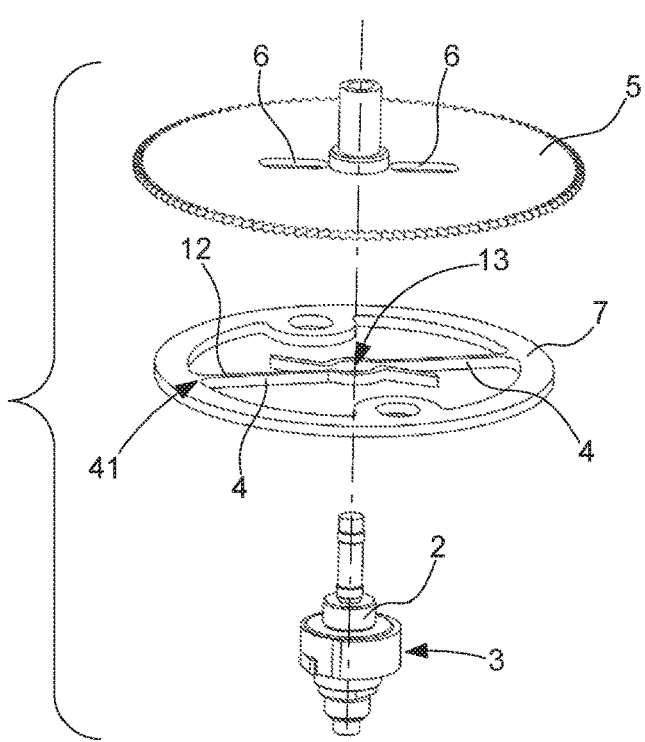
FIG. 2 represents a schematic, exploded perspective view of the components of the display mobile component aligned with the arbor of a drive mobile component.
Figure 3:
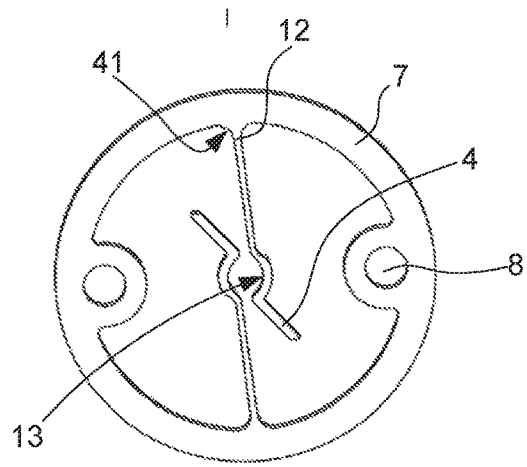
FIG. 3 represents a schematic, plan view of the one-piece resilient spring structure.
Figure 4:
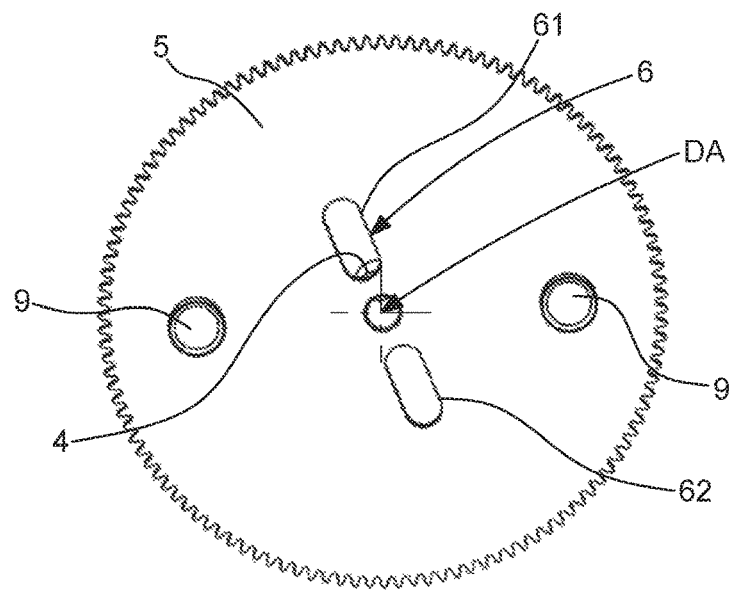
FIG. 4 represents a schematic plan view of the flange.
Figure 5:
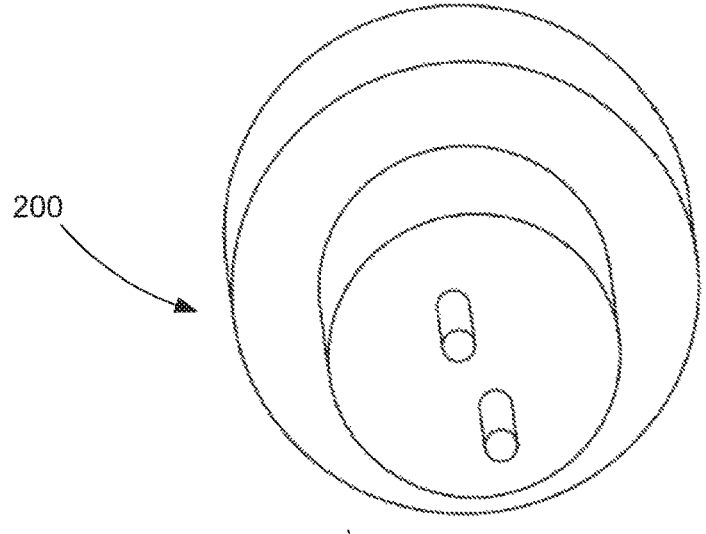
FIG. 5 represents, in a similar manner to FIG. 1, a tool arranged to cooperate with this display mobile component, in order to move apart the resilient strips contained therein.
Figure 6:
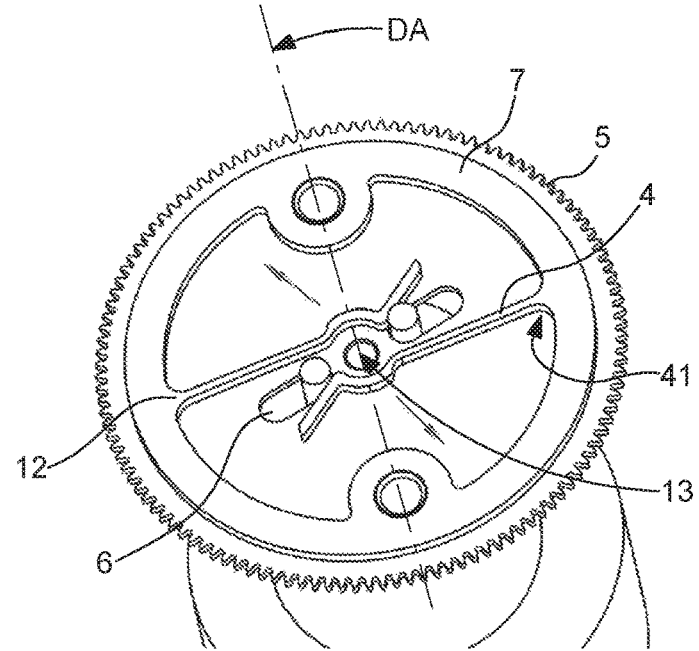
FIG. 6 represents, in a similar manner to FIG. 1, the cooperation of the tool of FIG. 5 with the display mobile component, in a spaced apart position of the strips.
Figure 7:
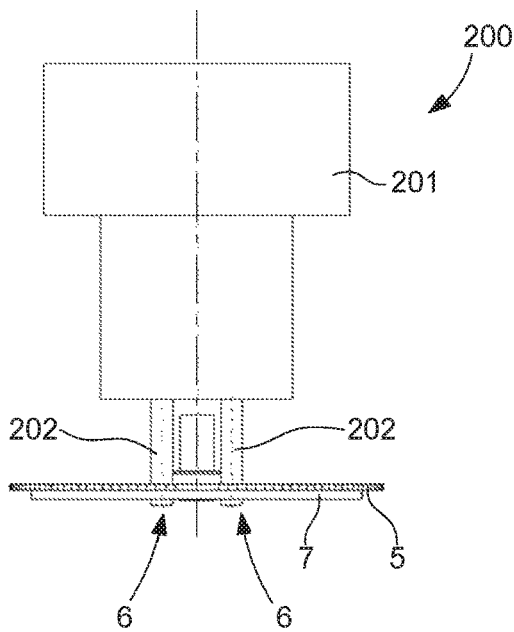
FIG. 7 is a side view of the components of FIG. 6 in the same position of cooperation.
Figure 8:
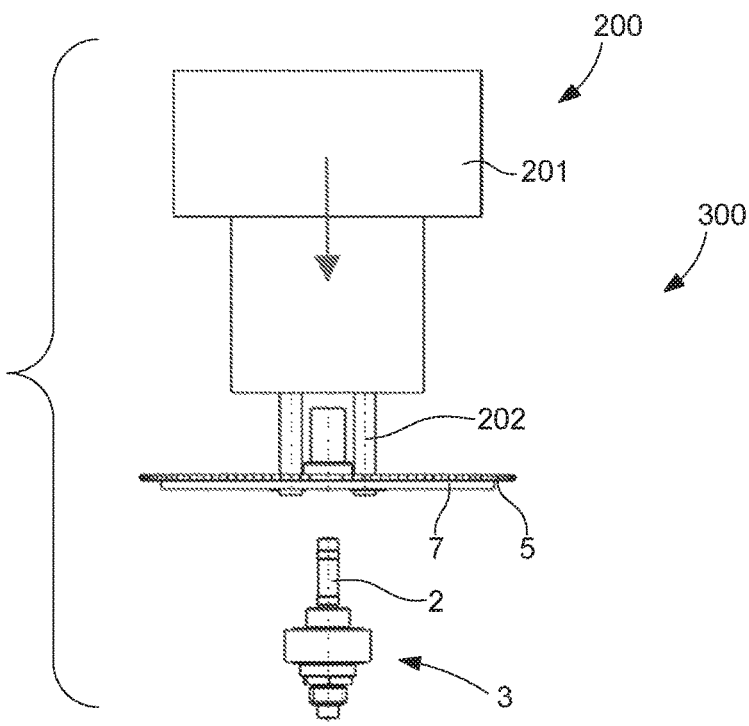
FIG. 8, which is similar to FIG. 7, shows the assembly thus formed approaching the arbor of the drive mobile component.
Figure 9:
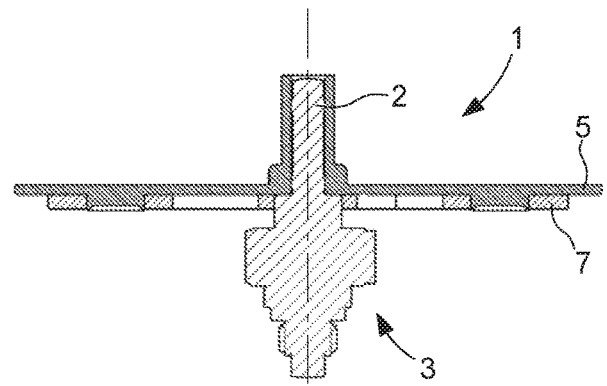
FIG. 9 is a sectional view of the display mobile component clamping the arbor of the drive mobile component.

The invention concerns friction systems for making adjustments, and more particularly but not exclusively for setting the time, in timepiece movements.

The invention more particularly concerns a timepiece display mobile component 1, comprising at least one resilient strip 4 intended to be returned to a rest position close to a display axis DA, in order to cooperate in a friction drive with an arbor 2 comprised in a drive mobile component 3 of a movement 100 or of a timepiece mechanism, about said display axis DA.

According to the invention, display mobile component 1 includes a flange 5 comprising, facing each resilient strip 4, an aperture 6 arranged for the insertion and guiding of a tool operated by an operator (such as tweezers or suchlike) or by a robotic manipulator, to enable the tool to move resilient strip 4 away from its rest position and to insert display mobile component 1 on an arbor 2 when resilient strip 4 is sufficiently far away for the mobile component to pass, and to ensure a constant friction value of all of resilient strips 4 on arbor 2, when resilient strips 4 are in frictional cooperation with arbor 2 and when the tool is no longer in contact with resilient strips 4.

More particularly, display mobile component 1 includes a plurality of resilient strips 4, which are arranged such that the resultant, on display axis DA, of the radial forces that they exert on an arbor 2 is zero.

More particularly, as seen in the non-limiting variant of the Figures, display mobile component 1 comprises two resilient strips 4, which are arranged symmetrically with respect to display axis DA, and apertures 6 are symmetrical oblong grooves with respect to display axis DA. More particularly, these apertures 6 are rectilinear oblong grooves 61, 62 which pass through display axis DA.

More particularly, all the resilient strips 4 comprised in display mobile component 1 are part of a common resilient one-piece structure 7, which is arranged to be pivotally mounted on flange 5, or to be assembled in a fixed position with flange 5, or to form flange 5.

More particularly, resilient one-piece structure 7 is arranged to be pivotally mounted on flange 5, to allow a greater radial extension of resilient strips 4 with respect to display axis DA, and comprises indexing elements 8. These latter are arranged to cooperate with complementary indexing elements 9 comprised in flange 5, to make them integral in rotation when resilient strips 4 are in frictional cooperation with arbor 2 and when tool 200 is no longer in contact with resilient strips 4.

Figure 10:
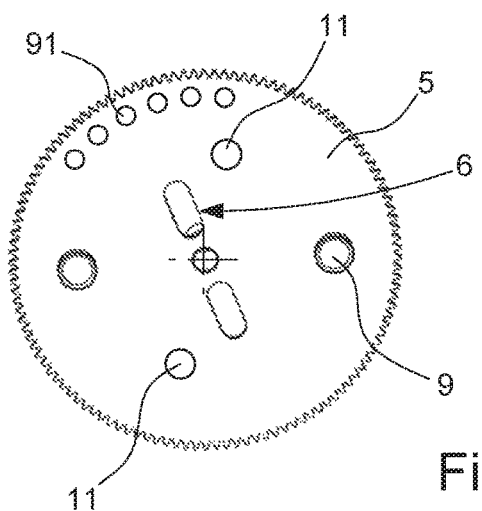
FIG. 10 is a variant of FIG. 4 with additional relief portions for moving apart the strips, and elements for relative indexing with the one-piece resilient spring structure represented in FIG. 11.
Figure 11:
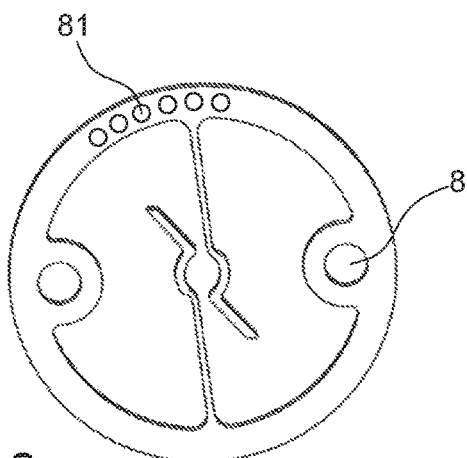
FIG. 11 shows one-piece spring structure 7 referenced above.

More particularly, as seen in FIG. 10, flange 5 includes, facing each resilient strip 4, a relief portion 11 which is arranged to rest on resilient strip 4 between, on one hand, its point of attachment or fastening to resilient one-piece structure 7, and, on the other, a friction area 13 comprised in resilient strip 4 in proximity to display axis DA, to change the abutment force exerted by resilient strips 4 as a function of the relative angular position between flange 5 and resilient one-piece structure 7.

More particularly, as seen in the Figures, common resilient one-piece structure 7 is removable and arranged to be assembled in a fixed position with flange 5. This fixed position can be indexed, through the cooperation of indexing elements 81 and complementary indexing elements 91 by means of a pin or the like, in a particular relative angular position.

In a particular variant that is not illustrated, common resilient one-piece structure 7 forms flange 5.

More particularly, each resilient strip 4 has at least one attachment 41 to flange 5 or to a common resilient one-piece structure 7 placed on flange 5, which attachment 41 is remote from display axis DA, in order to allow a maximum motion of resilient strip 4 in a radial travel with respect to display axis DA and near to display axis DA.

In the non-limiting variant illustrated by FIGS. 1 to 11, each resilient strip 4 is cantilevered with respect to its attachment 41, and comprises, at its distal end, or in proximity to its distal end, a friction area 13 which is arranged to cooperate in frictional cooperation with an arbor 2.

More particularly, apertures 6 comprise at least a first through guide hole 61, which is arranged to allow the insertion of a first end of a tool and at least a second through guide hole 62 which is arranged to allow the insertion of a second end of a tool. And, in at least one relative angular position between flange 5 and the at least one resilient strip 4, and in a rest position of the at least one resilient strip 4, the at least one resilient strip 4 is in at least partial superposition with first through guide hole 61 and/or second through guide hole 62, in order to be moved away from display axis DA during the insertion of the first end and the second end of a tool and/or during a relative rotation between flange 5 and each resilient strip 4 under the effect of a rotation imparted by a user to a tool following the insertion thereof.

Figure 12:
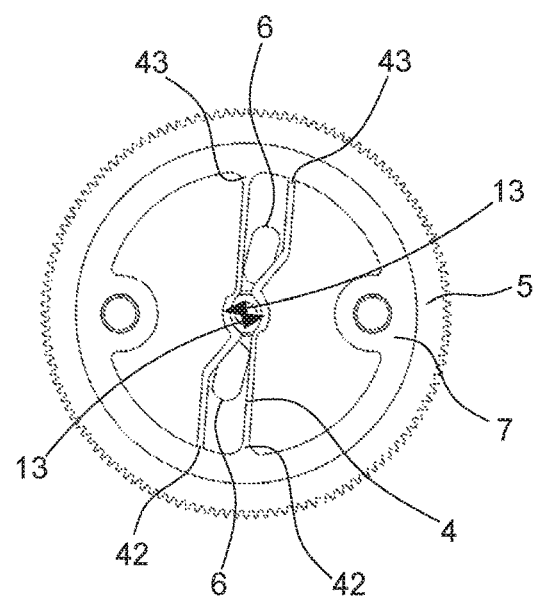
FIG. 12 represents, in a similar manner to FIG. 1, a variant wherein the strips are not in a cantilever arrangement, but taut between their two ends close to the periphery of the flange.
Figure 13:
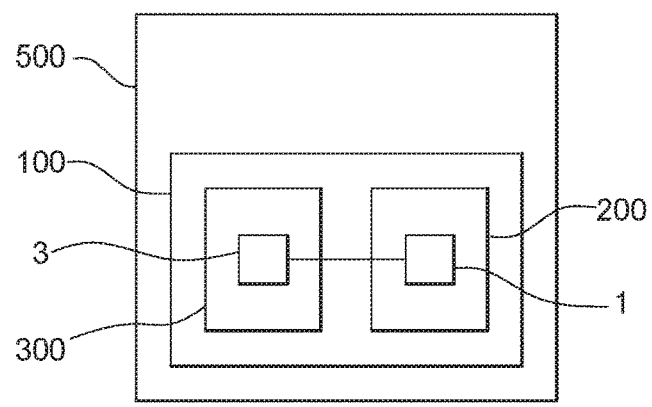
FIG. 13 is a block diagram representing a watch comprising a movement with a mechanism comprising a drive mobile component, and a display adjustment assembly comprising a display mobile component according to the invention.

FIG. 12 illustrates another variant which includes two resilient strips 4, each held at the two ends 42 and 43 thereof and taut in their operating position. More particularly, these two strips 4 are symmetrical with respect to display axis DA. In particular, these two strips are parallel to each other over a first section close to the attachments, and then converge substantially towards display axis DA in their central portion.

The invention also concerns a display adjustment assembly 200 including at least one such display mobile component 1. More particularly, this adjustment assembly 200 includes at least one tool 201 for manual use or for a robotic manipulator, comprising ends 202 arranged to cooperate in a complementary manner with apertures 6 comprised in the at least one display mobile component 1, which has an aperture 6 remote from that facing a single resilient strip 4 when the at least one display mobile component 1 has only one resilient strip 4.

The invention also concerns a timepiece mechanism 300 comprising at least one drive mobile component 3 comprising an arbor 2 arranged to cooperate with such a display mobile component 1, and/or such a display adjustment assembly 200. More particularly, at least one arbor 2 has a groove or shoulders forming means for limiting the endshake of the display mobile component 1 in the direction of display axis DA.

The invention also concerns a timepiece movement 100 comprising at least one such mechanism 300, and/or at least one such display mobile component 1 and/or at least one such display adjustment assembly 200.

The invention also concerns a timepiece 500, in particular a watch, including at least one such movement 100 and/or at least one such mechanism 300 and/or at least one such display mobile component 1 and/or at least one such display adjustment assembly 200.

In short, the mechanism is designed for any display mobile component, and finds particular application in an hour wheel friction, the invention forms an improved cannon-pinion.

Resilient on-piece spring structure 7 is, in particular, mounted integral with flange 5 and underneath the latter.

The assembly formed by resilient one-piece structure 7 and flange 5 is mounted on arbor 2 of drive mobile component 3 using a manual tool such as tweezers, or by an automated tool 200. The ends of the tool or of pins 202 comprised therein are positioned in apertures 6 of flange 5, which moves apart the arms of resilient one-piece spring structure 7, formed by resilient strips 4. The assembly formed by resilient one-piece structure 7 and flange 5 is placed on arbor 2 and the tool is removed. Thus, the arms of the spring are armed and generate a friction torque on arbor 2. For disassembly, the tool is used in the same manner.

The friction torque is easy to adjust, by increasing or decreasing the arming of the spring arms, or their dimensions (width/thickness).

Making a shoulder on arbor 2 is advantageous for axially limiting the assembly formed by resilient one-piece structure 7 and flange 5.

The invention provides various advantages:
assembly without forcing and without plastic deformation;
easy sizing calculation and simulation;
easily controllable friction torque;
good stability over time.

The invention claimed is:

1. A timepiece display mobile component (1) comprising at least one resilient strip (4) intended to be returned to a rest position close to a display axis (DA), to cooperate in a friction drive with an arbor (2) comprised in a drive mobile component (3) of a movement (100) or a timepiece mechanism (3), about said display axis (DA), wherein said display mobile component (1) includes a flange (5) comprising, facing each said resilient strip (4), an aperture (6) arranged for the insertion and guiding of a tool operated by an operator or by a robotic manipulator, to enable said tool to move said resilient strip (4) away from its rest position and to insert said display mobile component (1) on a said arbor (2) when said resilient strip (4) is sufficiently far away to allow said mobile component to pass, and to ensure a constant friction value of all of said resilient strips (4) on said arbor (2) when said resilient strips (4) are in frictional cooperation with said arbor (2) and when said tool is no longer in contact with said resilient strips (4), and wherein all of said resilient strips (4) comprised in said display mobile component (1) are part of a common resilient one-piece structure (7), characterized in that said resilient one-piece structure (7) is either removable and arranged to be assembled in a fixed position with said flange (5), or arranged to be pivotally mounted on said flange (5) to allow a greater radial extension of said resilient strips (4) with respect to said display axis (DA) and comprises indexing elements (8) arranged to cooperate with complementary indexing elements (9) comprised in said flange (5) to make them integral in rotation when said resilient strips (4) are in frictional cooperation with said arbor (2) and when said tool is no longer in contact with said resilient strips (4).

2. The timepiece display mobile component (1) according to claim 1, characterized in that said display mobile component (1) includes a plurality of said resilient strips (4) arranged such that the resultant, on said display axis (DA), of the radial forces exerted by said resilient strips on a said arbor (2) is zero.

3. The timepiece display mobile component (1) according to claim 2, characterized in that said display mobile component (1) includes two said resilient strips (4), symmetrically arranged with respect to said display axis (DA), and in that said apertures (6) are symmetrical oblong grooves with respect to said display axis (DA).

4. The timepiece display mobile component (1) according to claim 3, characterized in that said apertures (6) are rectilinear oblong grooves (61; 62) passing through said display axis (DA).

5. The timepiece display mobile component (1) according to claim 1, characterized in that said resilient one-piece structure (7) is arranged to be pivotally mounted on said flange (5), to allow a greater radial extension of said resilient strips (4) with respect to said display axis (DA), and includes indexing elements (8) arranged to cooperate with complementary indexing elements (9) comprised in said flange (5), to make them integral in rotation when said resilient strips (4) are in frictional cooperation with said arbor (2) and when said tool is no longer in contact with said resilient strips (4), and in that said flange (5) includes, facing each said resilient strip (4), a relief portion (11) arranged to rest on said resilient strip (4) between, on one hand, its point of attachment (12) or fastening to said resilient one-piece structure (7), and, on the other, a friction area (13) comprised in said resilient strip (4) in proximity to said display axis (DA), to change the abutment force exerted by said resilient strips (4) as a function of the relative angular position between said flange (5) and said resilient one-piece structure (7).

6. The timepiece display mobile component (1) according to claim 1, characterized in that each said resilient strip (4) comprises at least one attachment (41) to said flange (5) or to a common resilient one-piece structure (7) placed on said flange (5), which attachment (41) is remote from said display axis (DA) in order to allow a maximum motion of said resilient strip (4) in a radial travel with respect to said display axis (DA) and near to said display axis (DA).

7. The timepiece display mobile component (1) according to claim 6, characterized in that each said resilient strip (4) is cantilevered with respect to its attachment (41), and comprises, at the distal end thereof, or in proximity to the distal end thereof, a friction area (13) arranged to cooperate in frictional cooperation with a said arbor (2).

8. The timepiece display mobile component (1) according to claim 1, characterized in that said apertures (6) comprise at least a first through guide hole (61) arranged to allow the insertion of a first end of a tool and at least a second through guide hole (62) which is arranged to allow the insertion of a second end of a tool, and in that, in at least one relative angular position between said flange (5) and said at least one resilient strip (4), and in a rest position of said at least one resilient strip (4), said at least one resilient strip (4) is in at least partial superposition with said first through guide hole (61) and/or said second through guide hole (62), in order to be moved away from said display axis (DA) during the insertion of said first end and said second end of a tool and/or during a relative rotation between said flange (5) and each said resilient strip (4) under the effect of a rotation imparted by a user to a said tool following the insertion thereof.

9. The timepiece display adjustment assembly (200) comprising at least one display mobile component (1) according to claim 1, characterized in that said adjustment assembly (200) comprises at least one tool (201) for manual use or for a robotic manipulator, said tool having ends (202) arranged to cooperate in a complementary manner with said apertures (6) comprised in said at least one display mobile component (1), which includes an aperture (6) remote from the aperture facing a said single resilient strip (4) when said at least one display mobile component (1) has only one said resilient strip (4).

10. A timepiece mechanism (300) comprising at least one drive mobile component (3) comprising an arbor (2) arranged to cooperate with a display adjustment assembly (200) according to claim 9.

11. A timepiece mechanism (300) comprising at least one drive mobile component (3) comprising an arbor (2) arranged to cooperate with a display mobile component (1) according to claim 1.

12. The timepiece mechanism (300) according to claim 11, characterized in that at least one said arbor (2) has a groove or shoulders forming means for limiting the end-shake of said display mobile component (1) in the direction of said display axis (DA).

13. A watch (500) including at least one mechanism (300) according to claim 11, and/or at least one display mobile component (1) according to claim 1.

14. A timepiece movement (100) including at least one display mobile component (1) according to claim 1.

15. A watch (500) including at least one display mobile component (1) according to claim 1.

16. A watch (500) including at least one display adjustment assembly (200) according to claim 9.

* * * * *